Oct. 18, 1966   W. J. WEEKS   3,279,864
PNEUMATIC CONVEYOR
Filed March 23, 1964   2 Sheets-Sheet 1
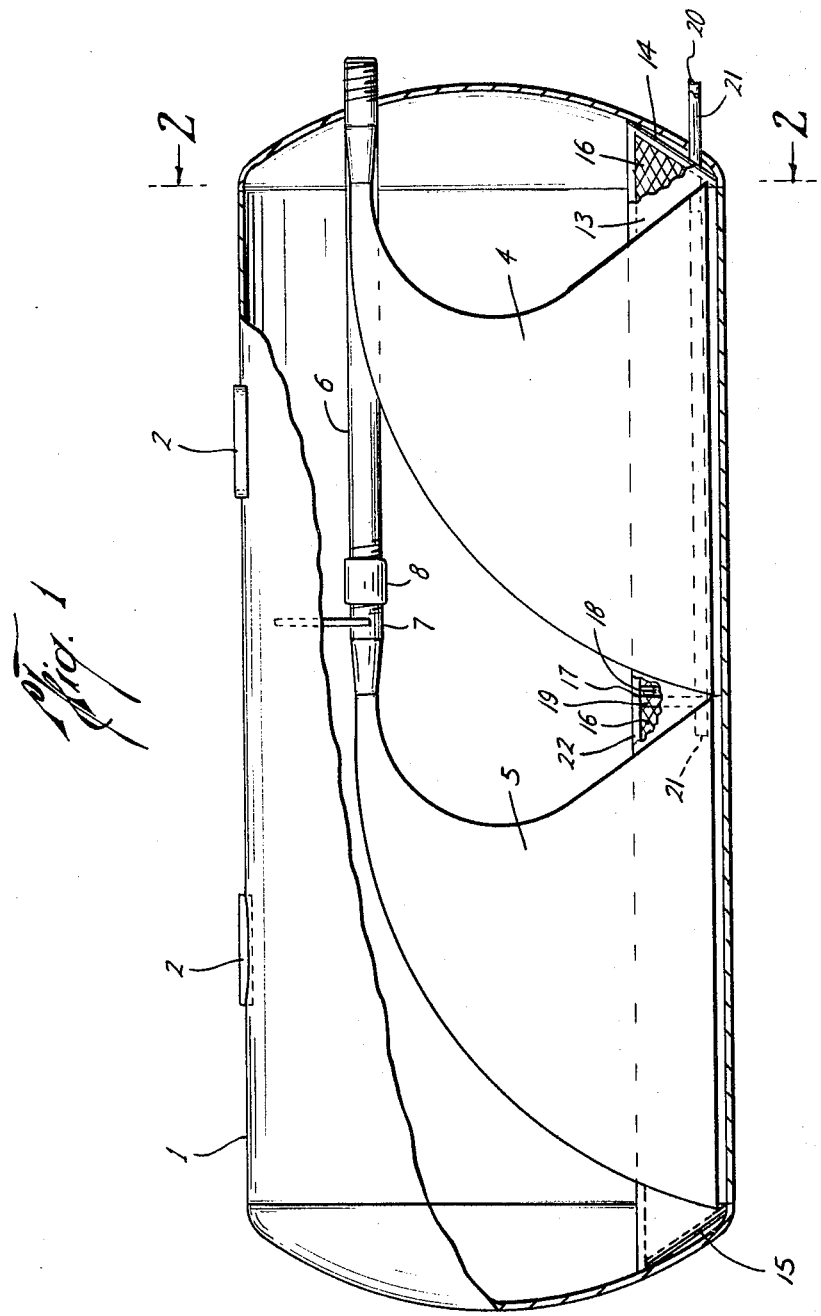
Wyatt J. Weeks
INVENTOR.
BY Pamela O. Wyatt
ATTORNEY Oct. 18, 1966   W. J. WEEKS   3,279,864
PNEUMATIC CONVEYOR
Filed March 23, 1964   2 Sheets-Sheet 2
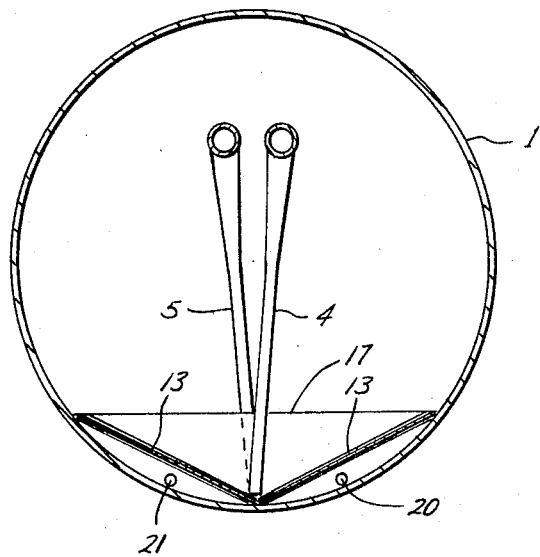
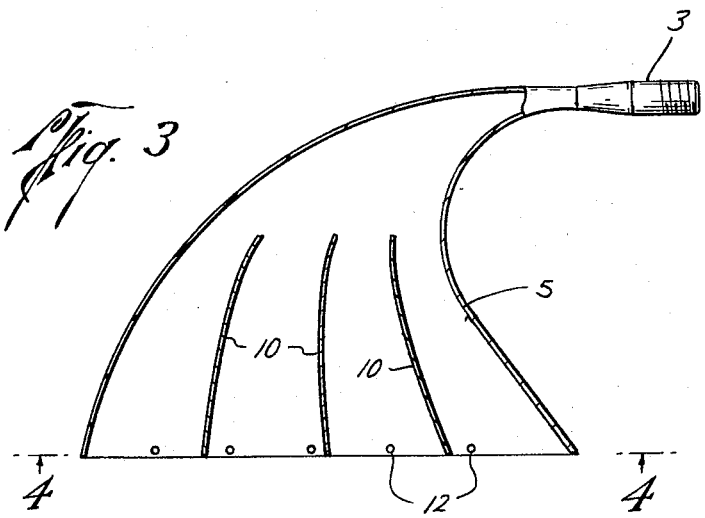
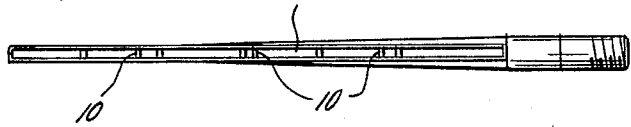
Wyatt J. Weeks
INVENTOR.
BY Ranselor O. Wyatt
ATTORNEY

United States Patent Office 3,279,864
Patented Oct. 18, 1966

3,279,864
PNEUMATIC CONVEYOR
Wyatt J. Weeks, 3815 Richmond Ave., Houston, Tex.
Filed Mar. 23, 1964, Ser. No. 353,942
6 Claims. (Cl. 302—53)

This invention relates to new and useful improvements in a pneumatic conveyor.

It is an object of this invention to provide a conveyor for moving dry substances, such as flour, cement and the like.

It is another object of the invention to provide a pneumatic conveyor for use in cylindrical vessels having novel means for moving substantially all of the contents of the vessel.

In vessels for dry powdered or granulated materials such as flour or cement, it is often difficult to unload the vessel completely by pneumatic means, due to the reaction of the material to air pressure and the nozzle area required for flow of the material being unloaded. It is an object of this invention to provide means for accomplishing the unloading of this type of material utilizing a low air pressure to aerate the material and accomplishing a maximum unloading of the contents of the vessel by providing a discharge nozzle area for the entire floor length of the vessel.

With the above and other objects in view, the invention has relation to certain novel features of construction, operation and arrangement of parts more particularly defined in the following specifications and illustrated in the accompanying drawings, wherein:

FIGURE 1 is a side elevational view of a cylindrical vessel with the side wall partially broken away, illustrating the interior construction.

FIGURE 2 is an end view, in cross section, taken on the line 2—2 of FIGURE 1.

FIGURE 3 is an enlarged cross sectional side elevational view of the nozzle employed, and FIGURE 4 is a bottom view, taken on the line 4—4 of FIGURE 3.

Referring now more particularly to the drawings, the numeral 1 designates a vessel, such as the cylindrical tank of a tank car, having the usual man hole covers 2, 2 which cover the leading ports in the usual manner. A pair of nozzles 4, 5 are mounted in the vessel 1, and have the common conduit 6, one end of which is extended through one end of the vessel and is externally threaded as at 3, the nozzle 5 having the externally threaded conduit 7 which connects into the other end of the conduit 6 by means of the nipple 8. A suitable hanger 9 is anchored at one end to the inside wall of the vessel 1 and at its other end to the conduit 7 to support the nozzles 4, 5.

Each nozzle 4, 5 is provided with suitable internal spacers 10, 10, preventing clogging of material passing through the nozzles, the bottom surface of each nozzle having the elongated narrow passageway 11 and a series of spacers 12, 12 in the said passageway along the bottom margin of the nozzles 4, 5, the spacers 10, 10 extending upwardly into the nozzles.

On the bottom of the vessel 1 are mounted the pairs of support baffles 16, 22, having the slanting end walls 14, 15 and a perforate body such as the expanded metal shown, and a screen of canvas, or other porous material, as 13, covers the baffles 16, 22 and is of sufficient density in weave to support the material in the vessel and prevent its sifting through the baffles but permitting a diffusion and penetration of air under pressure from beneath the baffles. A bulkhead 17 is formed approximately midway of the vessel 1 and the ends 18, 19 of the respective baffles abut this bulkhead. Air conduits 20, 21 extend through the end of the vessel 1 beneath the baffles 16, 16, the conduit 20 terminating before reaching the bulkhead 17 and the conduit 21 extending through the bulkhead 17 and terminating beneath the baffle 22.

The baffle supports 16, 22 may be welded or otherwise anchored to the vessel 1, and angled so that the abutting side margins are positioned immediately beneath the passageways 11, 11 of the nozzles 4, 5.

In operation, a suitable discharge conduit (not shown) may be attached to the externally threaded end of the conduit 3 and the air introduced into the vessel through the conduits 20, 21 will be diffused by the canvas 13 and will penetrate the canvas and permeate the contents of the vessel. The usual valve (not shown) in the discharge conduit is opened when approximately fifteen pounds per square inch air pressure has been built up in the vessel, and material in the vessel thus aerated will flow through the conduits 4, 5 into the discharge conduit and will continue to flow as long as the fifteen pound per square inch pressure is maintained in the vessel until the vessel has been completely unloaded.

The spacers 10, 10 provide stiffeners in the narrow nozzle, preventing collapsing of the nozzles, the walls of which are preferably thin, and these stiffeners also prevent turbulence in the flow of the material through the nozzles, extending from the nozzle opening upwardly into the nozzle. Spacer ports 12, 12 are provided along the margin of the nozzles which are adapted to receive suitable posts or bolts (not shown) to selectively anchor the nozzle intake opening with relation to the bottom surface of the tank.

While the foregoing is considered a preferred form of the invention, it is by way of illustration only, the broad principle of the invention being defined by the appended claims.

What I claim is:

1. In a pneumatic conveyor for vessels, a discharge conduit extending through one wall of the vessel, a pair of screened baffles adjacent the floor of said vessel, a pair abutting side margins and the other side margins being upwardly and outwardly extended, elongated nozzles having passageways abutting the apex of said baffles adjacent to the floor of the vessel and extending from one end of the vessel to the other and connected into said discharge conduit, means for maintaining a flow of air into the interior of the vessel and maintaining a preselected air pressure therein.

2. A pneumatic conveyor, a cylindrical vessel, screens mounted on the floor of the vessel at an inwardly and downwardly directed angle, the lowermost side margins of said screens being in abutting relation, means for introducing air into said vessel beneath said screens and maintaining a pressure of approximately fifteen pounds per square inch in said vessel, elongated nozzles in said vessel having an inlet passageway extending longitudinally thereof and positioned adjacent the apex of said screens and covering substantially the entire length of said vessel and having a common discharge conduit extending through one end of said vessel.

3. In a pneumatic conveyor, a vessel, a pair of narrow, elongated nozzles in said vessel, a common discharge conduit for said nozzles, an inlet passageway in said nozzles covering substantially the entire length of said vessel, a bulkhead in said vessel separating said nozzles and restricting the airflow to the respective nozzles, screen in said vessel between said nozzles and the floor of said vessel, means for introducing air into said vessel beneath said screens permeating the contents of said vessel and maintaining a preselected air pressure in said vessel to maintain the contents in a fluid state until fully discharged.

4. In a pneumatic conveyor, a vessel having a concave bottom, screens mounted on said bottom and slanted inwardly and downwardly, discharge nozzles mounted in said conveyor having elongated narrow inlet openings positioned immediately above the abutting side margins of said screens and tapering to a small tubular discharge terminal, and a common discharge conduit extending through the wall of said vessel for receiving a flow of the contents of said vessel from said nozzles.

5. In a pneumatic conveyor, a vessel having an elongated concave bottom, a series of nozzles mounted in said vessel having narrow, elongated inlet openings adjacent said bottom, bulkheads separating said nozzles for controlling the flow into said nozzles, screens between said nozzles and said bottom and means for maintaining a preselected air pressure in said vessel to maintain the contents in a fluid state until fully discharged.

6. In a pneumatic conveyor, a cylindrical vessel, a substantially V-shaped trough on the inside elongated wall of said vessel in position to form the floor of said vessel, a porous cover on the walls of said trough, means for introducing air beneath said trough to penetrate said cover and permeate the contents of said vessel and to maintain said contents in a fluid state, narrow, elongated nozzles in said vessel having intake openings adjacent said trough and tapered into small tubular discharge openings on the opposing ends, and a common discharge conduit extending through said vessel into which said nozzles discharge ends are connected.

References Cited by the Examiner
UNITED STATES PATENTS

| | | | |
|---|---|---|---|
| 1,971,853 | 8/1934 | Thlefeld | 302—29 |
| 2,039,217 | 4/1936 | Goddard | 302—58 |
| 2,255,438 | 9/1941 | Robinson | 302—53 |
| 2,723,054 | 11/1955 | Louden | 302—29 |
| 2,924,489 | 2/1960 | Beckmann | 302—53 |
| 3,191,785 | 6/1965 | Price | 214—83.28 |

EVON C. BLUNK, *Primary Examiner.*

ANDRES H. NIELSEN, *Examiner.*